United States Patent [19]

Minard et al.

[11] Patent Number: 5,074,381

[45] Date of Patent: Dec. 24, 1991

[54] APPARATUS FOR REMOVING SOLID PARTICULATES FROM OIL

[75] Inventors: Paul G. Minard, Winter Springs; Paul Toy, Jr., Oviedo, both of Fla.

[73] Assignee: Westinghouse Electric Corp., Pittsburgh, Pa.

[21] Appl. No.: 586,850

[22] Filed: Sep. 24, 1990

[51] Int. Cl.$^5$ .............................................. F01M 1/10
[52] U.S. Cl. .................................. 184/6.24; 210/450; 210/453
[58] Field of Search ............... 184/6.24; 210/450, 451, 210/453, 445

[56] References Cited

U.S. PATENT DOCUMENTS

| | | | |
|---|---|---|---|
| 2,068,837 | 1/1937 | Aronson | 210/445 |
| 2,256,145 | 9/1941 | Hock | 210/450 |
| 2,327,803 | 8/1943 | Kidd | 210/451 |
| 2,603,356 | 7/1952 | Hisey | 210/451 |
| 2,671,564 | 3/1954 | Fricke | 210/453 |
| 2,798,613 | 7/1957 | Tinker | 210/453 |
| 2,874,846 | 2/1959 | Herster | 210/453 |
| 3,240,342 | 3/1966 | Callahan et al. | 210/450 |
| 3,361,261 | 1/1968 | Fairey et al. | 210/445 |
| 3,400,575 | 9/1968 | Madden | 73/61 |
| 3,447,687 | 6/1969 | Canterbury | 210/451 |
| 3,750,888 | 8/1973 | Rinaldo | 210/451 |
| 3,771,624 | 11/1973 | Forgeron | 184/6.24 |
| 4,557,834 | 12/1985 | Mason | 210/445 |
| 4,615,413 | 10/1986 | Stevenson | 184/6.4 |

FOREIGN PATENT DOCUMENTS

| | | | |
|---|---|---|---|
| 0541887 | 6/1957 | Canada | 210/450 |
| 0656209 | 8/1951 | United Kingdom | 210/450 |

Primary Examiner—Ira S. Lazarus
Assistant Examiner—Alan B. Cariaso

[57] ABSTRACT

An apparatus for removing solid particulates from oil has a housing through which the oil flows with a screen releasably secured in the housing adjacent an outlet. The screen is releasably secured by either a biasing means, such as a spring or a threaded member engageable with a threaded section on the housing. A removable cover is provided on the open top of the housing and the screen and releasable securement device therefore are removable from the housing through the open top when the cover is not in place.

7 Claims, 2 Drawing Sheets

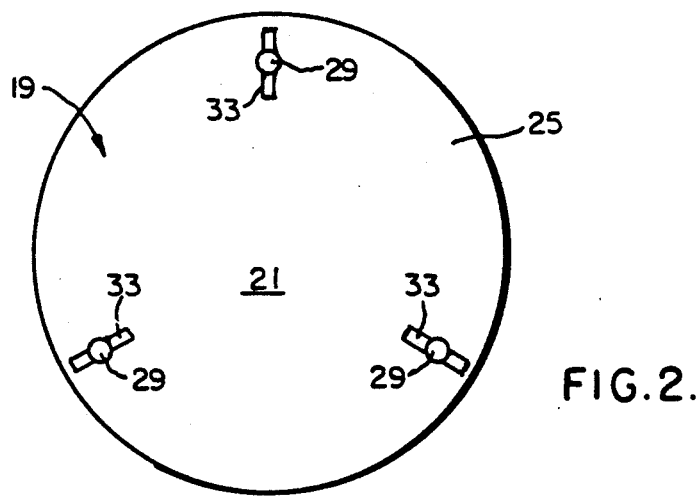
FIG.2.
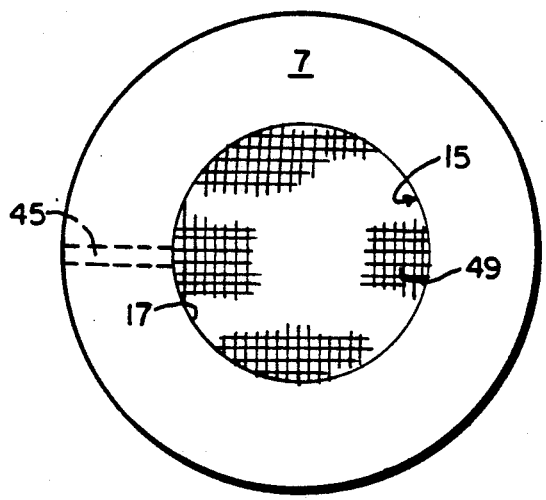
FIG.3.
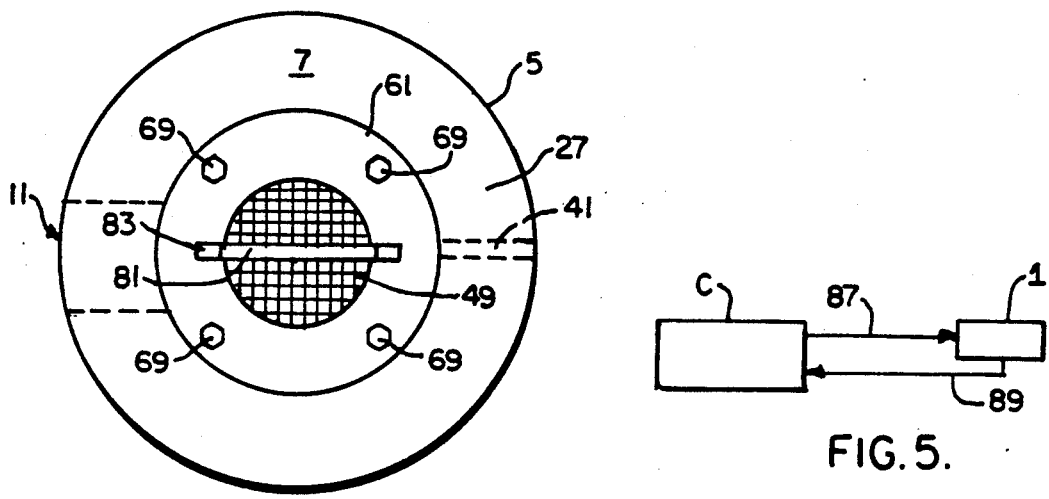
FIG.4.
FIG.5.

APPARATUS FOR REMOVING SOLID PARTICULATES FROM OIL

FIELD OF THE INVENTION

The present invention relates to apparatus for removing solid particulates from oil, and specifically for removing such particulates on a screen so as to enable analysis of the collected particulates.

BACKGROUND OF THE INVENTION

It is often desirable to flush oil through piping and components and determine whether metallic or other solid particulates are present in the oil to judge cleanliness of a system. During a shutdown of a turbine, for example for repair or other treatment of its turbine, it is recommended that the oil be flushed through the turbine to oil handling components, such as piping, to verify that the oil system meets cleanliness requirements. A verification of the cleanliness of the oil system is typically carried out by circulating the oil through a strainer assembly for a specified period of time, removing the strainer, washing any solid particles collected by the strainer onto a piece of filter paper, and analyzing the solid particles under a microscope.

A problem which exists is that of adequately getting the strainers clean enough prior to installation in the oil line that is to be flushed. Such strainers have typically consisted of a basket-type device, which may be about 1.5 inches (3.8 cm) in diameter and about 3 inches (7.6 cm) long, and lined with 150 mesh wire cloth, that is epoxied into place.

A new type of strainer or filter that has been suggested for use is a sampling screen assembly that would be used once and then discarded. This screen assembly comprises a polyester mesh that is secured between two gaskets, which screen assembly would be bolted or clamped between a pair of conventional pipe flanges, like a conventional flange gasket. A benefit of such a screen assembly is that its use would do away with the need to clean, and verify the cleanliness, of the screen. Such an assembly, however, would require flange bolt and nut manipulation for installation and removal of the screen assembly, as well as physically moving the flanges to affect installation or removal of the screen assembly.

SUMMARY OF THE INVENTION

An apparatus for removing solid particles from oil and has a housing and a removeable cover. The housing includes an upstanding side wall, a bottom wall, and an open top, with an inlet in the side wall to which an inlet conduit is attachable, and an outlet, preferably in the bottom wall to which an outlet conduit is attachable. A screen for removing particulates from oil is disposed in the housing, and a releasable securement means secures the screen adjacent the outlet of the housing, such that oil flowing through the housing must pass through the screen. A removeable cover is secured to the housing so as to seal the open top thereof, with the screen and releasable securement means being removeable through the open top of the housing after the removeable top is removed therefrom.

In one embodiment, the releasable securement of the screen is provided by a biasing device such as a spring. A bottom collar has a flange that extends into the housing outlet and an attached upper ring secures the screen between the upper ring and bottom collar. The spring is preferably secured to the upper ring and the removeable cover, when secured to the housing, urges the ring and collar into contact with a collar seal or gasket between the bottom collar and the upper surface of the housing bottom to seal the same.

In another embodiment, a threaded section is provided in the housing adjacently above the outlet in the bottom wall and the screen is releasably secured against a support surface on the inner surface of the bottom wall by threaded section of the housing, such that the screen is positioned between the threaded member and the bottom wall and urged against the support surface.

DESCRIPTION OF THE DRAWINGS

The invention will become more readily apparent from the following description of preferred embodiments thereof shown, by way of example only, in the accompanying drawings, wherein:

FIG. 2 is a plan view of the apparatus shown in FIG. 1 with the removeable top in place;

FIG. 3 is a bottom view of the apparatus shown in FIG. 1;

FIG. 4 is a plan view similar to FIG. 2 with the removeable cover removed showing the interior chamber of the apparatus;

FIG. 5 is a schematic illustration of the apparatus of the present invention attached to the discharge and return conduits of an oil containing component to be flushed.

DETAILED DESCRIPTION

Figure 1:
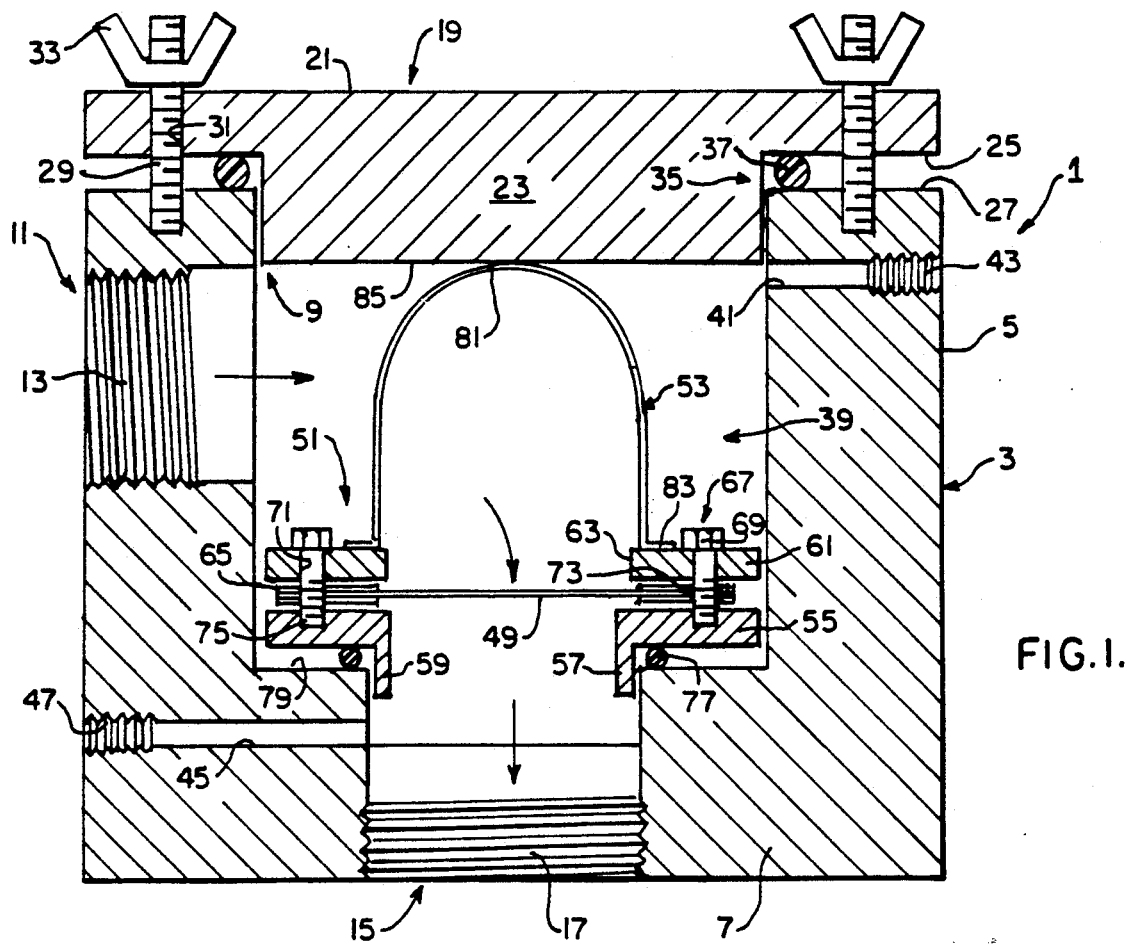
FIG. 1 is a vertical cross-sectional view of an embodiment of an apparatus for removing solid particulates from oil according to the present invention.

Referring now to FIG. 1, an apparatus 1 for removing solid particulates from oil is illustrated having a housing 3 which includes an upstanding side wall 5, a bottom wall 7, and an open top 9. The housing 3 may be of various shapes, but is preferably of a cylindrical shape. An inlet 11 is provided in the side wall 5, preferably as a first threaded bore 13 formed through the side wall 5 so as to threadedly secure an inlet conduit to the housing 3, while an outlet 15 is also provided on the housing, such as a second threaded bore 17, so as to threadedly secure an outlet conduit to the housing 3. The outlet 15 is preferably formed in the bottom wall 7.

A removable cover 19 is used to seal off the open top 9 of the housing 3, and means provided to secure the removeable cover to the housing, such as clamps, clips, latches or a nut and bolt arrangement. The removable cover preferably is formed as a plate 21 having a downwardly depending center section 23, the periphery 25 of the plate 21 confronting the top 27 of the side wall 5, while the downwardly depending section 23 extends into the housing 3. The removable cover 19 is secured to the housing 3, such as by use of threaded studs 29 secured to the side wall 5 and passing through an aperture 31 in the periphery 25 of the plate 21, with a wing nut 33 engageable with the stud and used to tighten the removeable cover on the housing 3. A sealing means 35, such as a sealing gasket or cover seal 37, between the top 27 of the side wall 5 and the periphery 25 of the plate 21, is used to sealingly engage the removeable cover 19 to the housing 3. A plurality of such studs 29, apertures 31 and wing nuts 33 are preferably used about the top of the housing to evenly removably secure the removable cover 19 to the housing 3. Other securing means than that illustrated may, of course, be used to removably secure the removeable cover to the housing, provided that the same provides easy removal of the cover 19 and access to the chamber 39 formed by the housing 3. A vent opening 41 is provided through the side wall 5, preferably having a threaded outer section 43, for attachment therewith of a drain conduit and shut-off valve (not shown). A drain opening 45 is provided through the housing, preferably through the bottom 7, which has a threaded outer section 47, for attachment therewith of a drain-conduit and shut-off valve (not shown).

Within the chamber 39 of the housing 3 there is positioned a filter or screen 49 which is secured in the housing by a means 51 for releasably securing the screen therein. The means 51 for releasably securing the screen 49, such as clamps, clips or a nut and bolt arrangement, positions the screen 49 adjacent the outlet 15 such that any oil entering the housing through the inlet 11 must pass through the screen 49, for collection and examination of so id particulates therefrom for sampling purposes, prior to discharge of the oil from the housing through the outlet 15, as indicated by the arrows in FIG. 1.

The screen may be of any material and dimension that are suitable for the purpose of removal of solid particulates of interest. One useful screen comprises a polyester mesh secured between two circular supporting rings, the polyester mesh having openings therein of about 105 microns, such that any particles of a size greater than 0.005 inch (0.0127 cm) will be retained, while the oil flows through the polyester mesh.

The means 51 for releasably sealing the screen is illustrated in FIG. as a biasing means 53 which is urged into contact with the screen 49 by the removable cover 19. As shown, a bottom collar 55 has a bottom passageway 57 therethrough and a flange 59 which extends into its outlet 15 of the housing. An upper ring 61, complementary with the bottom collar 55, and having an upper passageway 63 therethrough, is provided, and the screen 49, which may be sandwiched between two circumferential supporting rings 65 is disposed between the bottom collar 55 and the upper ring 61. Means 67 for securing the screen 49 between the bottom collar 55 and the upper ring 61 may comprise bolts 69 which pass through the circumferential supporting rings 65, and are threadedly engaged in threaded bores 75 in the bottom collar 55. A sealing gasket or collar seal 77 is disposed between the bottom collar 55 and the top surface 79 of the bottom wall 7.

The biasing means 53, such as a leaf spring 81, is preferably attached to the upper ring 61, such as by tack welding or otherwise attaching horizontal lugs 83 to the upper ring 61, and is of such a size that upon insertion of the means 51 for releasably securing the screen 49 in the housing 3, and attachment of the removable lid 19 to the housing 3, the lower surface 85 of the cover will be urged against the leaf spring 81 and, through upper ring 61 and bottom collar 55, compresses the collar seal 77.

The attachment of the leaf spring 81 to the upper ring 61, in addition to acting as a biasing means, can provide a handle to lift the bottom collar 55, screen 49 and upper ring 61 as a combined unit from the chamber 39 of the housing 3 through the open top 9 when the removable cover 19 is removed from the housing 3.

FIG. 5 schematically illustrates the use of the apparatus of the present invention in removing, for sampling, of solid particulate particles from an oil containing component c, such as an oil system of a turbine. A first, or discharge conduit 87 is attached to an opening in the component c at one end and to the inlet 11 of the housing 3 at the other end thereof. A second, or return conduit 89 is attached at one end to the outlet 15 of the housing 3 and at the other end thereof to another opening in the component c. Oil is discharged from the component c through discharge conduit 87, passes through the screen in the apparatus 1 and returns to the component c through the return conduit 89. While this system schematically illustrates return of the oil to the component c, the oil need not be returned thereto, but other use or disposal thereof may be effected.

Figure 6:
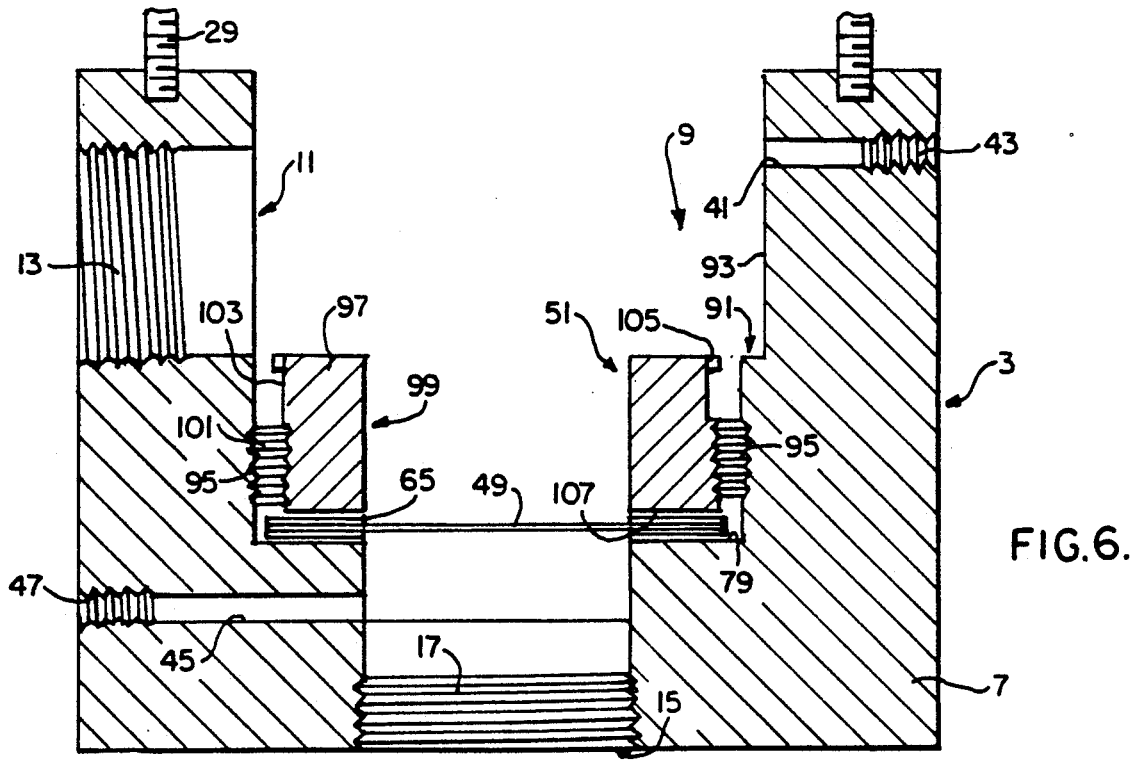
FIG. 6 is a vertical, cross-sectional view of another embodiment of an apparatus according to the present invention with the removeable cover removed.

Another embodiment of the apparatus 1 of the present invention is shown in FIG. 6 where an alternate means 51 for releasably securing the screen 49 is used. In this embodiment, a shoulder 91 is formed on the inner surface 93 of the side wall 5 adjacent the outlet 15, and a threaded section 95 provided adjacently above the outlet 15. In this embodiment, a threaded member 97, having a passageway 99 therethrough and threads 101 on the outer wall 103 thereof, has lugs 105 or other gripping means. With use of the threaded member 97, the screen 49 is situated in the housing with circumferential supporting ring 65 positioned between a bottom wall 107 of the threaded member 97, and the top or supporting surface 79 of the bottom wall 7. The threaded member 97 is then threadably engaged with the threaded section 95 on the housing 3 and rotated to urge the screen against the support surface 97.

In the second embodiment, also, the means 51 for releasably securing the screen 49 into position, such that oil flowing through the housing 3 must pass through the screen, the threaded member 97 and the screen 49 are removeable from the chamber 39 through the open top 9 of the housing 3 for analysis of particulate solids trapped by the screen.

The housing 3 and removeable cover 19, in either embodiment, may be made of any suitable material that will not contaminate oil passing through the housing, such as steel, brass, aluminum or the like.

What is claimed is:

1. An apparatus for removing solid particulates from oil comprising:

a housing having an upstanding side wall, a bottom wall, and an open top;

said housing having an inlet in the side wall to which an inlet conduit is attachable; and an outlet to which an outlet conduit is attachable;

a screen, sandwiched between two circumferential support rings, disposed in said housing for removing solid particulates from oil flowing therethrough;

means for releasably securing said screen in the housing adjacent the outlet thereof, such that oil entering the housing through said inlet must pass through the screen, for removal of solid particulates therefrom, prior to discharge from the housing through said outlet; and a removable cover secured to the housing to seal the open top thereof, with said means for releasably securing said screen in the housing comprising biasing means urged into contact with said screen by said removable cover, whereby said screen and means for releasably securing said screen are removable through the open top of said housing when said removable cover is removed from the housing.

2. The apparatus for removing solid particulates from oil as defined in claim 1, including a bottom collar, having a flange extending into the outlet of said housing, and an upper ring, with the support rings of said screen disposed between the bottom collar and upper ring, and means for releasably securing said screen between the bottom collar and upper ring, and wherein said biasing means comprising a spring secured to said upper ring and disposed between said upper ring and said removeable cover.

3. The apparatus for removing solid particulates from oil as defined in claim 2, wherein a cover seal is provided between the removable cover and said housing, and a collar seal is disposed between said bottom collar and said housing.

4. An apparatus for removing solid particulates from oil comprising:
- a housing having an upstanding side wall, a bottom wall, and an open top;
- the housing having an inlet in the side wall to which an inlet conduit is attachable; and an outlet to which an outlet conduit is attachable;
- a screen, sandwiched between two circumferential support rings, disposed in said housing for removing solid particulates from an oil flowing therethrough;
- a bottom collar having a flange extending into the outlet of said housing;
- an upper ring, with the support rings of said screen disposed between the bottom collar and ring;
- means for securing the support rings of said screen between the bottom collar and upper ring;
- means for releasably securing said screen in the housing adjacent the outlet thereof, comprising a biasing means urged into contact with said upper ring by a removeable cover, such that oil entering the housing through said inlet must pass through the screen, for removal of solid particulates therefrom, prior to discharge from the housing through said outlet; and
- said removeable cover secured to the housing to seal the open top thereof, whereby said screen and means for releasably securing said screen are removable through the open top of said housing when said removable cover is removed from the housing.

5. The apparatus for removing solid particulates from oil as defined in claim 4, wherein said biasing means comprises a spring secured to said ring, a cover seal is provided between the removable cover and said housing, and a collar seal is provided between said bottom collar and said housing.

6. An apparatus for removing solid particulates from oil comprising:
- a housing having an upstanding side wall, a bottom wall, and an open top;
- said housing having an inlet in the side wall to which an inlet conduit is attachable; and an outlet in said bottom wall to which an outlet conduit is attachable;
- a screen, sandwiched between two circumferential support rings, disposed in said housing for removing solid particulates from an oil flowing therethrough;
- a threaded section in the housing adjacently above the outlet in the bottom wall;
- a support surface on the inner surface of said bottom wall;
- means for releasably securing said screen in the housing adjacent the outlet thereof, such that oil entering the housing through said inlet must pass through the screen, for removal of solid particulates therefrom, prior to discharge from the housing through said outlet, comprising a threaded member threadedly secured with the threaded section of the housing, and the support rings of said screen are positioned between said bottom wall and said threaded member and urged against said support surface by said threaded member; and
- a removable cover secured to the housing to seal the open top thereof, whereby said screen and means for releasably securing said screen are removable through the open top of said housing when said removeable cover is removed from the housing.

7. An apparatus for removing solid particulates from oil comprising:
- a housing having an upstanding side wall, a bottom wall, and an open top;
- said housing having an inlet in the side wall to which an inlet conduit is attachable; and an outlet in said bottom wall to which an outlet conduit is attachable;
- a threaded section provided in the housing adjacently above said bottom wall;
- a support surface provided on the inner surface of said bottom wall;
- a screen, sandwiched between two circumferential support rings, disposed in said housing for removing solid particulates from an oil flowing therethrough;
- means for releasably securing said screen in the housing adjacent the outlet thereof comprising a threaded member threadedly secured with said threaded section of said housing, with said support rings of said screen positioned between said bottom wall and said threaded member and urged against said support surface by said threaded member, such that oil entering the housing through said inlet must pass through the screen, for removal of solid particulates therefrom, prior to discharge from the housing through said outlet; and
- a removable cover secured to the housing to seal the open top thereof, whereby said screen and means for releasably securing said screen are removable through the open top of said housing when said removable cover is removed from the housing.

* * * * *